(12) United States Patent
Taguchi

(10) Patent No.: US 9,085,301 B2
(45) Date of Patent: Jul. 21, 2015

(54) VEHICLE CONTROL DEVICE

(75) Inventor: Koji Taguchi, Isehara (JP)

(73) Assignee: TOYOTA JIDOSHA KABUSHIKI KAISHA, Toyota (JP)

(*) Notice: Subject to any disclaimer, the term of this patent is extended or adjusted under 35 U.S.C. 154(b) by 312 days.

(21) Appl. No.: 13/520,205

(22) PCT Filed: Feb. 16, 2010

(86) PCT No.: PCT/JP2010/052259
§ 371 (c)(1),
(2), (4) Date: Jul. 2, 2012

(87) PCT Pub. No.: WO2011/101949
PCT Pub. Date: Aug. 25, 2011

(65) Prior Publication Data
US 2013/0013164 A1   Jan. 10, 2013

(51) Int. Cl.
| B60K 31/00 | (2006.01) |
| B60W 30/14 | (2006.01) |
| B60W 50/00 | (2006.01) |
| B60W 30/18 | (2012.01) |

(52) U.S. Cl.
CPC ....... *B60W 30/143* (2013.01); *B60W 30/18154* (2013.01); *B60W 50/0097* (2013.01); *B60K 2031/0025* (2013.01); *B60W 2030/1809* (2013.01); *B60W 2550/22* (2013.01); *Y02T 10/52* (2013.01); *Y02T 10/84* (2013.01)

(58) Field of Classification Search
CPC ........ B60K 6/48; B60W 10/06; B60W 10/08; B60W 10/26; B60W 20/00; B60W 2550/20
See application file for complete search history.

(56) References Cited

U.S. PATENT DOCUMENTS

| 5,428,544 | A  | * | 6/1995  | Shyu ............................. 701/117 |
| 8,005,615 | B2 | * | 8/2011  | Okabe .......................... 701/301 |
| 8,532,862 | B2 | * | 9/2013  | Neff ............................... 701/25 |
| 8,600,830 | B2 | * | 12/2013 | Hoffberg ..................... 705/26.3 |
| 2003/0135318 | A1 | * | 7/2003 | Tellis et al. ..................... 701/96 |

(Continued)

FOREIGN PATENT DOCUMENTS

| JP | A-56-22113 | 3/1981 |
| JP | A-2007-293388 | 11/2007 |

(Continued)

OTHER PUBLICATIONS

Mar. 16, 2010 International Search Report issued in International Patent Application No. PCT/JP2010/052259.

*Primary Examiner* — Helal A Algahaim
*Assistant Examiner* — Paul Castro
(74) *Attorney, Agent, or Firm* — Oliff PLC

(57) ABSTRACT

A vehicle control device generates a speed pattern alternately repeating an acceleration travel pattern having a section accelerating a host vehicle and an inertia travel pattern having a section with an acceleration driving force of zero and a deceleration braking force of zero with respect to the wheels of the host vehicle. The speed pattern is generated by reducing speed of the host vehicle in front of any one position of an intersection of the road on which the host vehicle travels and an exit leading to the road. The intersection and the exit may encounter another vehicle, and may include a traffic flow of other vehicles on a road with a host vehicle. Matching a proved speed by reducing vehicle speed of a speed pattern with a position of an intersection or an exit, the host vehicle may cooperate with traffic flow to improve fuel efficiency.

8 Claims, 11 Drawing Sheets

(56) References Cited

U.S. PATENT DOCUMENTS

| | | | |
|---|---|---|---|
| 2006/0265115 A1* | 11/2006 | Etori et al. | 701/96 |
| 2008/0029318 A1* | 2/2008 | Proietty et al. | 180/65.2 |
| 2010/0204870 A1* | 8/2010 | Saeki | 701/29 |
| 2013/0245866 A1* | 9/2013 | Kuretake | 701/22 |

FOREIGN PATENT DOCUMENTS

| | | |
|---|---|---|
| JP | A-2008-74337 | 4/2008 |
| JP | A-2008-204094 | 9/2008 |
| JP | A-2009-070101 | 4/2009 |

* cited by examiner

VEHICLE CONTROL DEVICE

TECHNICAL FIELD

The present invention relates to a vehicle control device, and more particularly, to a vehicle control device for generating a speed pattern of a host vehicle.

BACKGROUND ART

In recent years, with the growing awareness of betterment of the environment, improvement in the fuel efficiency of vehicles has become a very important subject. In a contest competing over the travelling distance on one liter of gasoline, a method of causing a vehicle to travel under its own inertia, after first accelerating the vehicle through the engine output, without driving the wheels though the engine output or decelerating though regeneration is known to be effective.

For example, Patent Literature 1 discloses a vehicle control device applied to a hybrid vehicle using both a gasoline engine and an electric motor for power, including non-regeneration and non-acceleration travel pattern generating means for generating a non-regeneration non-acceleration travel pattern which is a travel speed pattern in a case where non-regeneration non-acceleration travel, in which neither acceleration by the engine nor regeneration are performed, is performed; target travel speed pattern generating means for generating a target travel speed pattern which is the target speed in a deceleration target position located to the front in the travel direction based on the generated non-regeneration non-acceleration travel pattern; and control means for controlling the travel speed of the vehicle based on the generated target travel speed pattern. Since the convenience demanded by many general users is satisfied if average speed is maintained, a technology which improves fuel efficiency while maintaining average speed is preferable in society.

CITATION LIST

Patent Literature

[Patent Literature 1] Japanese Unexamined Patent Application Publication No. 2008-74337

SUMMARY OF INVENTION

Technical Problem

However, a main problem when applying the above fuel efficiency improving technology to general roads, is that the travel disturbs traffic around the host vehicle if travel matching the speed of the traffic flow around the host vehicle is not achieved. On general roads other than limited highways, it is ordinary for the speed of the traffic flow to change due to various external factors. Since the application of antisocial, uncooperative industrial products to general roads is difficult, there is a concern that actual industrial products may adopt specifications in which improvement of fuel efficiency is excessively suppressed.

If the above fuel efficiency improving technology is able to be applied to general roads while being suitable to the traffic flow around the host vehicle, the fuel efficiency may be improved without disturbing the existing traffic. It is considered that there is a great social demand for improving fuel efficiency from both a standposition of improving the environment and an economic standposition. For this reason, a technology which improves fuel efficiency while cooperating with traffic around the host vehicle is essential in order to bring the above technology improving fuel efficiency into widespread use.

The invention has been made in view of the above problems, and an object of the invention is to improve fuel efficiency while cooperating with traffic surrounding a host vehicle.

Solution to Problem

The present invention is a vehicle control device including a speed pattern generating unit that generates a speed pattern which repeatedly alternates between an acceleration travel pattern having a section accelerating a host vehicle by applying a driving force in the acceleration direction with respect to the wheels of the host vehicle, and an inertia travel pattern having a section with a driving force of zero in the acceleration direction and a braking force of zero in the deceleration with respect to wheels of the host vehicle, wherein the speed pattern generating unit generates the speed pattern such that speed of the host vehicle is reduced in front of one of the positions of an intersection of a road on which the host vehicle travels and an exit which leads to the road on which the host vehicle travels.

According to this configuration, since the speed pattern generating unit generates a speed pattern which repeatedly alternates between an acceleration travel pattern having a section accelerating a vehicle by applying a driving force in the acceleration direction with respect to the wheels of the host vehicle and an inertia travel pattern having a section with a driving force of zero in the acceleration direction and a braking force of zero in the deceleration with respect to wheels of a host vehicle, fuel efficiency can be improved. Further, the speed pattern generating unit generates the speed pattern such that speed of the host vehicle is reduced in front of any one position of an intersection on which the host vehicle travels and an exit which leads to a road on which the host vehicle travels. The host vehicle has a possibility of encountering another vehicle at the intersection and the exit, which are positions that include other vehicles forming a traffic flow on a road on which a host vehicle travels and is compelled to reduce speed. Accordingly, by matching the position in which vehicle speed of a speed pattern is reduced with a position of an intersection or an exit at which speed is compelled to be reduced, the host vehicle cooperates with peripheral traffic of the host vehicle and fuel efficiency may be improved.

Further, in the invention, the inertia travel pattern, having a section with a driving force of zero in the acceleration direction with respect to the wheels of a host vehicle and a braking force of zero in the deceleration, means a travel pattern which is operated by only friction resistance with a bearing or rolling resistance with a road surface in the vehicle wheels without performing driving or regeneration of vehicle wheels by an internal-combustion engine or an electric motor or the like and has a section traveled in a state as though the transmission were situated in a neutral operation location. In the inertia travel pattern, there is no need to minimize the motion energy of a vehicle. For example, it is preferable that in the inertia travel pattern, braking by regeneration, or braking by disc brake and drum brake may be appropriately performed in a partial section.

In this case, the speed pattern generating unit may generate a speed pattern in which speed of the host vehicle becomes a local minimum value in front of any one position of the intersection and the exit.

According to this configuration, the speed pattern generating unit generates a speed pattern in which the speed of the host vehicle becomes a local minimum value in front of any one position of the intersection and the exit. By matching a local minimum value of the vehicle speed of the speed pattern with the position of the intersection or the exit which is locally compelled to reduce speed, the host vehicle cooperates with peripheral traffic and fuel efficiency may be improved, thereby further increasing efficiency.

Further, the speed pattern generating unit may generate the travel pattern such that speed of a host vehicle is more reduced in front of any one position of the intersection and the exit in the case of higher possibility of the host vehicle encountering with another vehicle in any one of the intersection and the exit.

According to this configuration, the speed pattern generating unit may generate a travel pattern such that speed of a host vehicle is more reduced in front of either one position of an intersection and an exit in the case of higher possibility of the host vehicle encountering another vehicle in any one of the intersection and the exit. The speed pattern generating unit generates a travel pattern such that speed of the host vehicle is more reduced in the case of a position having higher possibility to encounter with other vehicles and a higher possibility being compelled to reduce speed, so that the host vehicle cooperates with peripheral traffic the host vehicle and fuel efficiency may be improved, thereby further increasing efficiency.

Moreover, when there is no leading vehicle, the speed pattern generating unit may set deceleration in the speed pattern according to average deceleration by an operation of a driver for the host vehicle at a stop signal. When there is a leading vehicle, the speed pattern generating unit may set the deceleration in the speed pattern according to the smaller of average deceleration of the leading vehicle and average deceleration by the operation of the driver of the host vehicle at the stop signal.

According to this configuration, the speed pattern generating unit sets deceleration in a speed pattern according to average deceleration by an operation of a driver for a host vehicle at a stop signal when there is no leading vehicle. When there is a leading vehicle, the speed pattern generating unit sets the deceleration in a speed pattern according to the smaller of average deceleration of the leading vehicle and average deceleration by an operation of the driver of the host vehicle at a stop signal. When there is no leading vehicle, by setting the deceleration in the speed pattern according to average deceleration by an operation of a driver for a host vehicle during a stop signal, a driver for the host vehicle may be prevented from feeling uncomfortable. When there is a leading vehicle, the deceleration in a speed pattern may be set according to the smaller of average deceleration of the leading vehicle and average deceleration by an operation of the driver of the host vehicle during a stop signal to prevent from contacting with the leading vehicle, thereby resulting in generation of a speed pattern cooperating with peripheral traffic the host vehicle.

Moreover, the speed pattern generating unit may generate the speed pattern such that the speed of the host vehicle is reduced in a position that a signal displayed on any of traffic signals of the intersection and the exit becomes known.

According to this configuration, the speed pattern generating unit generates a speed pattern such that the speed of the host vehicle is reduced in a position that a signal displayed on any of traffic signals of the intersection and the exit becomes known. There are various types of a traffic signal on a general road including a traffic signal having a good perspective from a host vehicle, a traffic signal having a bad perspective from the host vehicle, and a traffic signal capable of receiving information of signals displayed by an optical beacon or the like. For this reason, since the speed pattern generating unit generates a speed pattern in which target speed of a host vehicle is reduced in a position that a signal displayed on traffic signal becomes known instead of uniformly reducing speed in front of the traffic signal, it can generate the speed pattern capable of improving fuel efficiency according to conditions of the traffic signal.

In this case, the speed pattern generating unit may further generate the speed pattern in which the speed of the host vehicle becomes a local minimum value in a position that a signal displayed on any of traffic signals of the intersection and the exit becomes known.

According to this configuration, the speed pattern generating unit generates a speed pattern in which speed of the host vehicle becomes a local minimum value in a position that a signal displayed on any of traffic signals of the intersection and the exit becomes known. For this reason, a speed pattern capable of improving fuel efficiency according to conditions of a traffic signal can be generated with higher efficiency.

Further, the speed pattern generating unit may set an average position in which deceleration starts by an operation of a driver of the host vehicle in front of the traffic signal as the position that a signal displayed on the traffic signal of the road on which the host vehicle travels becomes known.

According to this configuration, the speed pattern generating unit may set an average position in which deceleration starts by an operation of a driver for a host vehicle in a position that a signal displayed on the traffic signal of the road on which the host vehicle travels becomes known. The driver of the host vehicle may be prevented from feeling uncomfortable.

Further, when there is the leading vehicle, the speed pattern generating unit may set a position separated from an average position in which deceleration of the leading vehicle started by a distance between the leading vehicle and the host vehicle in front of a traffic signal to a position that a signal displayed on the traffic signal of the road on which the host vehicle travels becomes known.

According to this configuration, the speed pattern generating unit sets a position separated from an average position in which deceleration of the leading vehicle starts by a distance between the leading vehicle and the host vehicle in front of a traffic signal in a position that a signal displayed on the traffic signal of the road on which the host vehicle travels becomes known when there is the leading vehicle. By doing this, a speed pattern which may improve fuel efficiency according to conditions of a traffic signal by considering the deceleration of leading vehicles while cooperating with peripheral traffic of the host vehicle can be generated.

Moreover, the speed pattern generating unit may set a position that a signal displayed on the traffic signal of the road on which the host vehicle travels becomes known according to a situation of whether information about the signal displayed by the traffic signal may be obtained by wireless communication.

In this configuration, the speed pattern generating unit sets a position that a signal displayed on the traffic signal of the road on which the host vehicle travels becomes known according to a situation of whether information about the signal displayed from the traffic signal is obtained by wireless communication. According to whether the information about the signal displayed by the traffic signal is obtained by wireless communication such as an optical beacon, the speed pattern realizable is greatly changed. For this reason, a speed pattern in which fuel efficiency may be improved according to a situation of the traffic signal can be generated with higher efficiency.

In addition, the speed pattern generating unit may not execute the speed pattern in the host vehicle when the density of other vehicles existing around the host vehicle is equal to or greater than a predetermined threshold value.

According to this configuration, the speed pattern generating unit does not execute a speed pattern in the host vehicle when the density of other vehicles existing around the host vehicle is equal to or greater than the predetermined threshold value. When the density of other vehicles existing around the host vehicle is equal to or greater than the predetermined threshold value, due to low fuel consumption, there is a case that a traveling method through inertia is not preferable. For this reason, when the density of the other vehicles existing around the host vehicle is equal to or greater than the predetermined threshold value, a speed pattern for low-fuel combustion in the host vehicle is not executed, so that it is possible to cooperate with traffic around the host vehicle.

Advantageous Effects of Invention

According to a vehicle control device of the present invention, fuel efficiency can be improved while cooperating with traffic around a host vehicle.

BRIEF DESCRIPTION OF DRAWINGS

FIG. 3 is a graph illustrating an ideal speed pattern for realizing low-fuel consumption when a vehicle stops in front of an intersection or the like.

DESCRIPTION OF EMBODIMENTS

Figure 1:
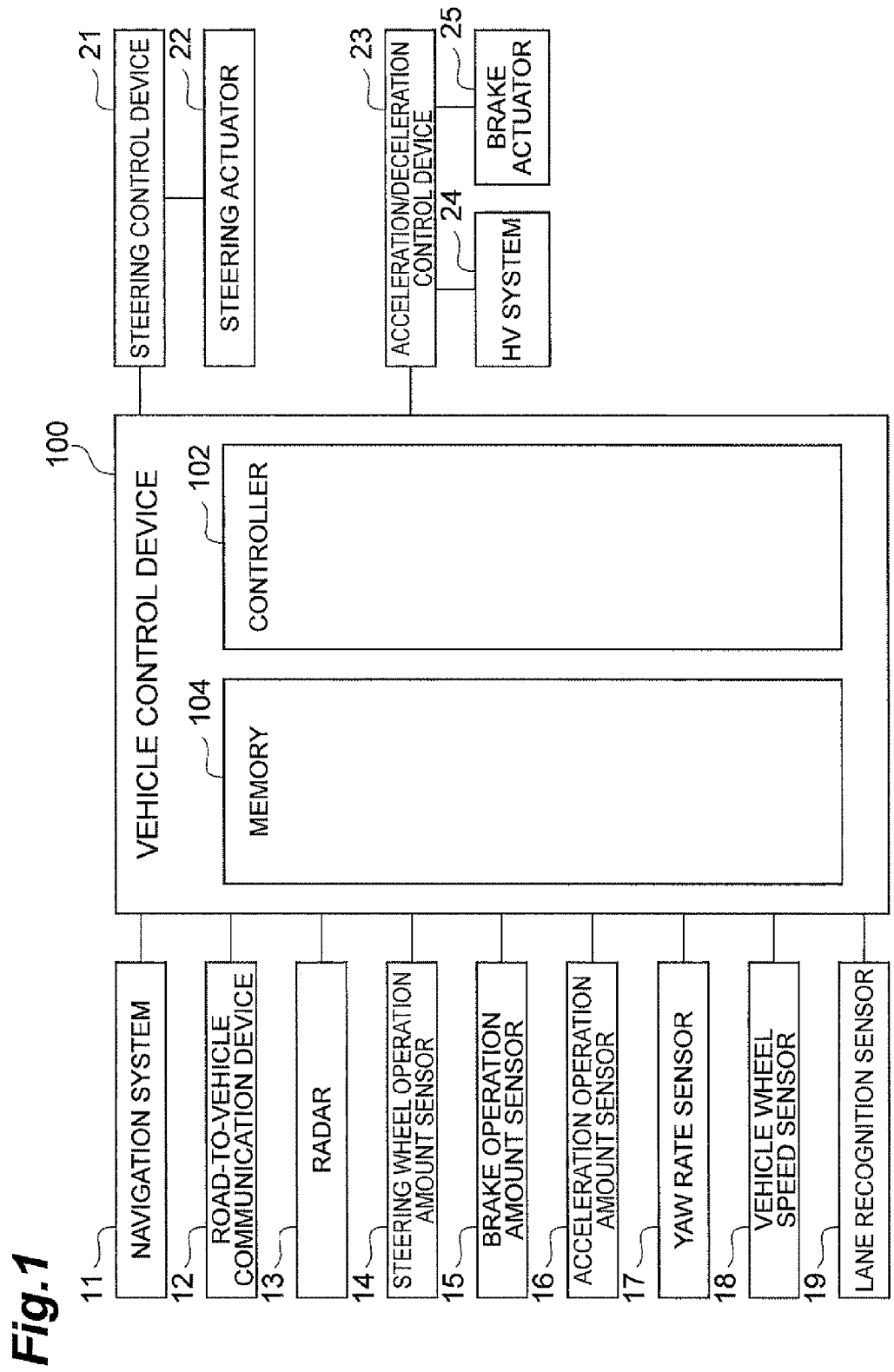
FIG. 1 is a section diagram illustrating a configuration of a vehicle control device according to a first embodiment.

Hereinafter, an embodiment of the invention will be described with reference to the accompanying drawings. As illustrated in FIG. 1, a vehicle control device 100 of a first embodiment of the invention includes a navigation system 11, a road-to-vehicle communication device 12, a radar 13, a steering wheel operation amount sensor 14, a brake operation amount sensor 15, an accelerator operation amount sensor 16, a yaw rate sensor 17, a vehicle wheel speed sensor 18, a lane recognition sensor 19, a steering control device 21, a steering actuator 22, an acceleration/deceleration control device 23, an HV system 24, and a brake actuator 25. The vehicle control device 100 of this embodiment is mounted in a hybrid vehicle using both of a gasoline engine and an electric motor as power. The vehicle control device 100 of this embodiment is a device that generates a speed pattern which repeatedly alternates between an acceleration travel pattern having a section accelerating a vehicle by applying a driving force in the acceleration direction with respect to the wheels of a host vehicle and an inertia travel pattern having a section with a driving force of zero in the acceleration direction and a braking force of zero with respect to wheels of a host vehicle in the deceleration to improve fuel efficiency.

The navigation system 11 detects a current location of a host vehicle by Global Positioning System (GPS) and guides a route to a destination. Further, the navigation system 11 acquires information about a shape of a road on which the host vehicle is travelling from a database storing map information.

The road-to-vehicle communication device 12 acquires information regarding such things as the shape of a road in front of the host vehicle or information regarding a signal displayed on a traffic signal from optical beacons and the like of roadside facilities. Specifically, the radar 13 includes a front of radar, a rear radar, a front-side radar, a rear-side radar, and the like. The radar 13 acquires information regarding a shape of a road on which the host vehicle travels. The radar 13 acquires information about a leading vehicle or another vehicle around the host vehicle. In this embodiment, a camera and the like other than the radar 13 may be equipped.

The steering wheel handling amount sensor 14, the brake operation amount sensor 15, and the accelerator operation amount sensor 16 are sensors detecting operation amounts of a steering wheel, a brake pedal, and an acceleration pedal, respectively.

The yaw rate sensor 17 is a sensor detecting a yaw rate of the host vehicle. The vehicle wheel speed sensor 18 is a sensor for detecting the speed of the host vehicle by detecting the rotation speed of wheels of the host vehicle. The lane recognition sensor 19 is a sensor for recognizing a traffic lane on which the host vehicle travels by imaging a road in front of the host vehicle using a camera.

The vehicle control device 100 is a device such as an Electronic Control Unit (ECU) including a user interface such as a controller 102, a memory 104, a display (not shown), speakers and the like. The controller 102 is a Central Processing Unit (CPU) or the like controlling an overall operation of the vehicle control device 100. The memory 104 is a device such as a hard disk or the like storing various types of databases. The memory 104 stores information about a driving history by a driver for the host vehicle or information about a driving history of another vehicle such as a leading vehicle.

The steering control device 21 is a device transmitting a steering control signal to the steering actuator 22 based on a command signal received from the vehicle control device 100. The steering actuator 22 is an actuator providing steering torque to a steering tool by an electric motor or the like.

The acceleration/deceleration control device 23 is a device for driving the HV system 24 or the brake actuator 25 based on a command signal received from the vehicle control device 100. The HV system 24 is a system for driving wheels of the host vehicle selectively using a gasoline engine and an electric motor. The brake actuator 25 is an actuator providing braking force to a brake tool by hydraulic pressure or regeneration of an electric motor or the like.

Figure 2:
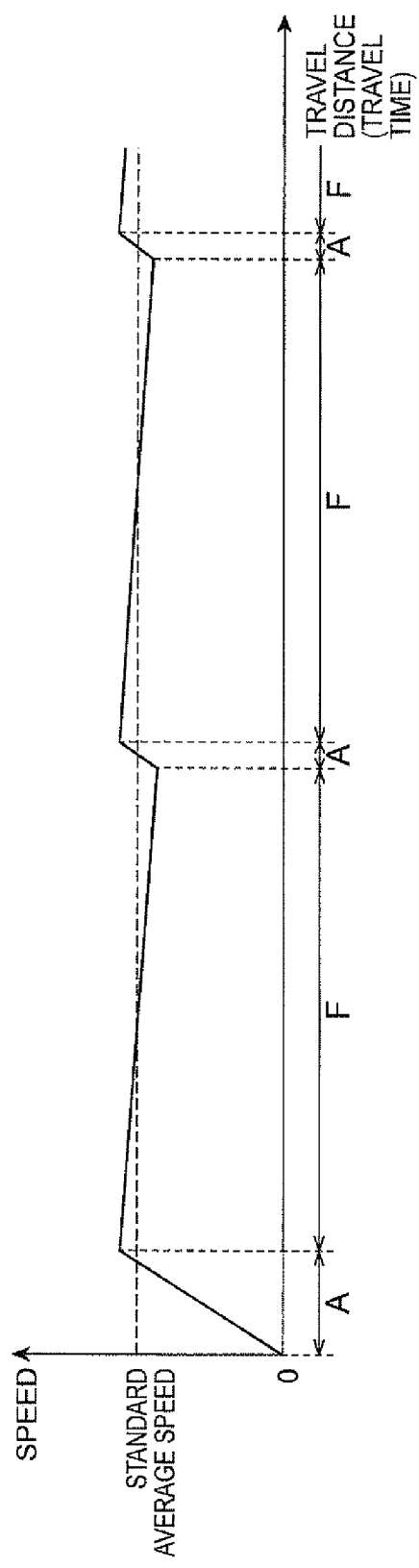
FIG. 2 is a graph illustrating an ideal speed pattern for realizing low-fuel consumption.

Hereinafter, an operation of a vehicle control device 100 according to this embodiment will be described. The vehicle control device 100 of this embodiment generates a speed pattern as illustrated in FIG. 2 as an ideal speed pattern realizing low-fuel consumption. That is, during an acceleration travel interval A, the vehicle control device 100 operates a gasoline engine in an area of a load (torque) and the number of revolutions in which heat efficiency of the gasoline engine becomes a maximum value. The gasoline engine drives vehicle wheels in an operation state with maximum heat efficiency to accelerate the host vehicle. When the speed of the host vehicle exceeds the target average speed by predetermined speed, the acceleration travel interval A is terminated. According to this, optimum low-fuel consumption is realized in acceleration travel interval A.

Meanwhile, during an inertia travel interval F, the vehicle control device 100 stops the gasoline engine and does not perform regeneration by an electronic motor or braking by a disc brake, a drum brake, and the like. That is, during the inertia travel interval F, a driving force in the acceleration direction with respect to wheels of the host vehicle and a braking force in the deceleration become zero. When the speed of the host vehicle is less than the goal average speed by the predetermined speed, the inertia travel interval F is terminated. According to this, during the inertia travel interval F, fuel consumption becomes zero. Furthermore, during the inertia travel interval F, motion energy stored during the acceleration travel interval A may be most efficiently used.

An acceleration travel pattern during the acceleration travel interval A and an inertia travel pattern during an inertia travel interval F are alternately performed such that the host vehicle travels at target average speed. A generally performed speed pattern is an operation in which speed of the host vehicle is maintained at the target average speed after the host vehicle is accelerated to the target average speed. However, in general, if the gasoline engine is operated in areas other than an area having a load (torque) and the number of revolutions with maximum heat efficiency, heat efficiency of the gasoline engine is lowered and fuel efficiency deteriorates. For this reason, a speed pattern as illustrated in FIG. 2 may be performed to realize the best fuel efficiency at the same average speed.

Figure 3:
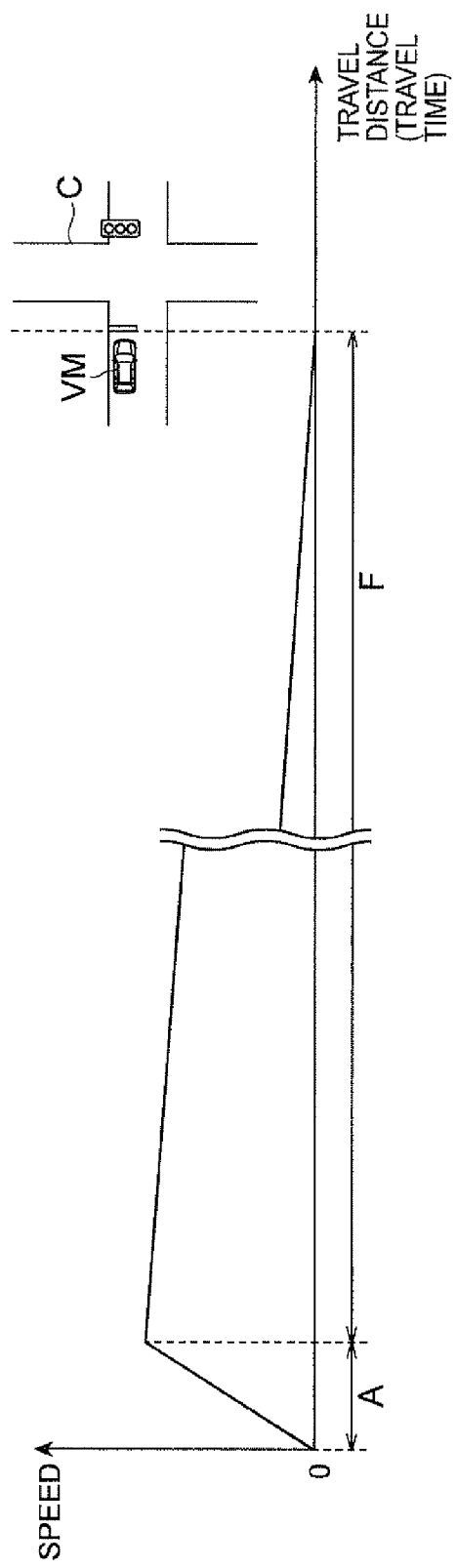

There is a case where the host vehicle stops in a predetermined location such as in front of an intersection or the like in a speed pattern as illustrated in FIG. 2. In this case, as illustrated in FIG. 3, during the inertia travel interval F, speed of a host vehicle VM is slowly lowered due to friction resistance with a bearing and rolling resistance with a road surface, a speed pattern is generated such that the host vehicle VM stops in front of an intersection C or the like finally.

Figure 4:
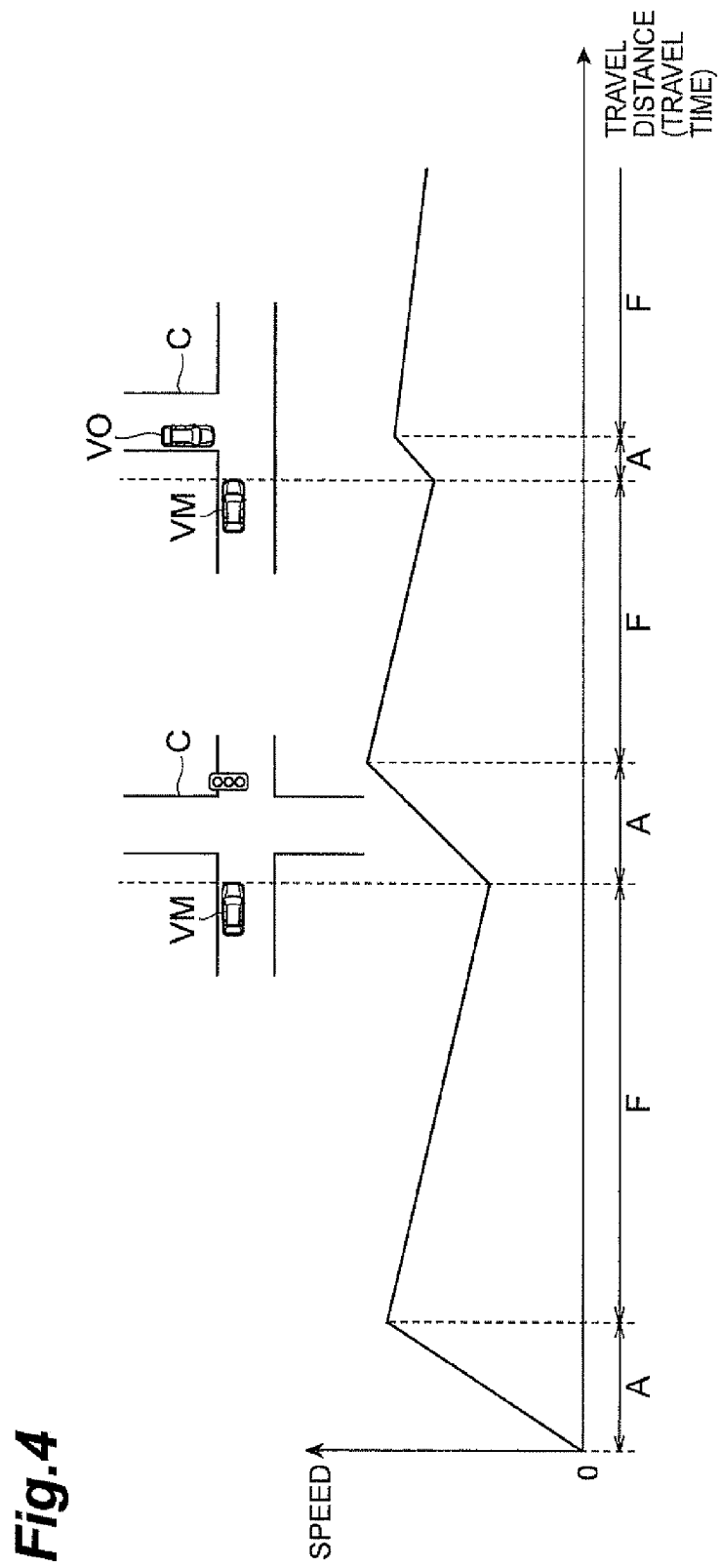
FIG. 4 is a graph illustrating a representative speed pattern according to the first embodiment.

However, in a general road, speed of a traffic flow generally varies according to various external factors. Therefore, in this embodiment, as illustrated in FIG. 4, the host vehicle VM encounters with another vehicle VO, and a speed pattern is generated such that speed of the host vehicle VM is reduced in front of an intersection C, exit E of facilities, or the like having possibility which is compelled to stop. More ideally, the speed pattern is generated such that speed of the host vehicle VM becomes a local minimum value in front of the intersection C, exit E of facilities, and the like.

For this reason, in this embodiment, although heat efficiency during the acceleration travel interval A or loss of motion energy during the inertia travel interval F are distant from the ideal speed pattern of FIG. 2, a speed pattern is generated prioritizing a reduction in speed of the host vehicle VM in front of the intersection C or the exit E. According to this, since the speed of the host vehicle VM is already reduced although the host vehicle is compelled to stop in front of the intersection C and the exit E, the loss of the motion energy during the inertia travel interval F is suppressed to the minimum.

Moreover, so as to change the ideal speed pattern of FIG. 2 to an actual speed pattern illustrated in FIG. 4, an acceleration travel pattern with the least reduction in heat efficiency is generated during the acceleration travel interval A. Furthermore, during the automatic travel interval F, without performing braking using disk brakes or drum brakes, or braking (engine brake) by increasing the gear ratio of the transmission with the engine operating as far as possible, effective utilization of the motion energy is increased through braking by regeneration.

Figure 5:
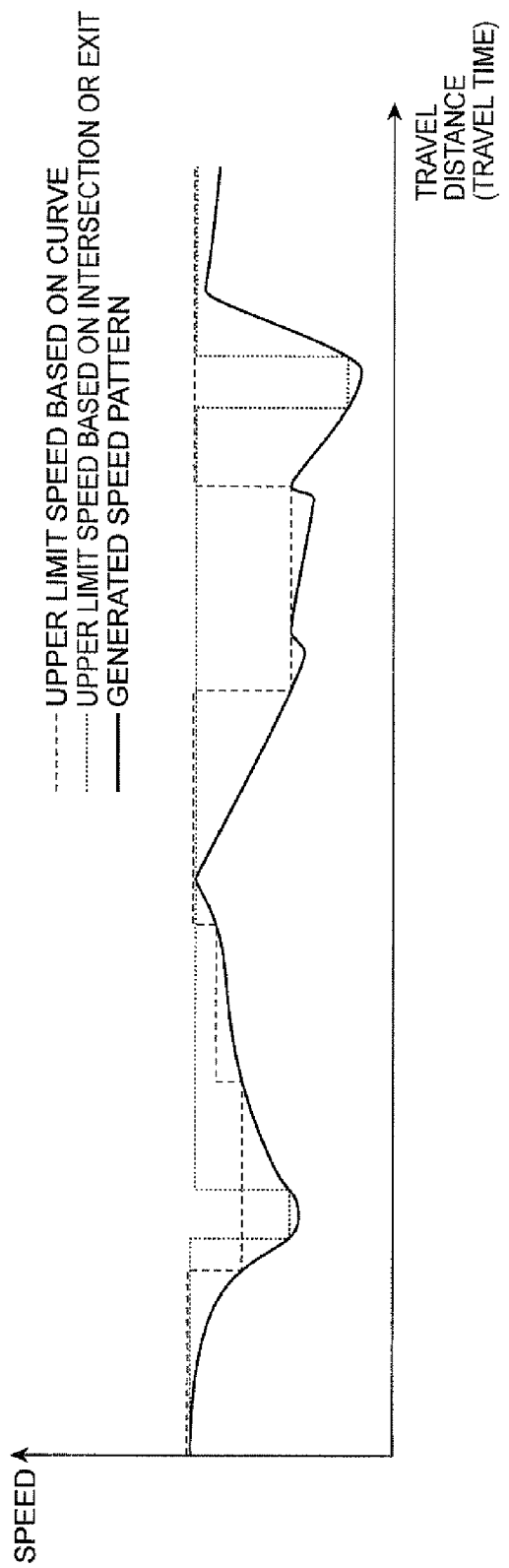
FIG. 5 is a graph illustrating a specific speed pattern generated in the first embodiment.

First, in this embodiment, as illustrated in FIG. 5, the vehicle control device 100 determines in advance as an assumption the maximum speed in each position according to a curve in the road on which the host vehicle travels as the curve speed. The curve speed is computed from acceleration in the traverse direction expected at each position, general safety standards, and the driving history of the driver of the host vehicle with reference to map data in the navigation system.

Figure 6:
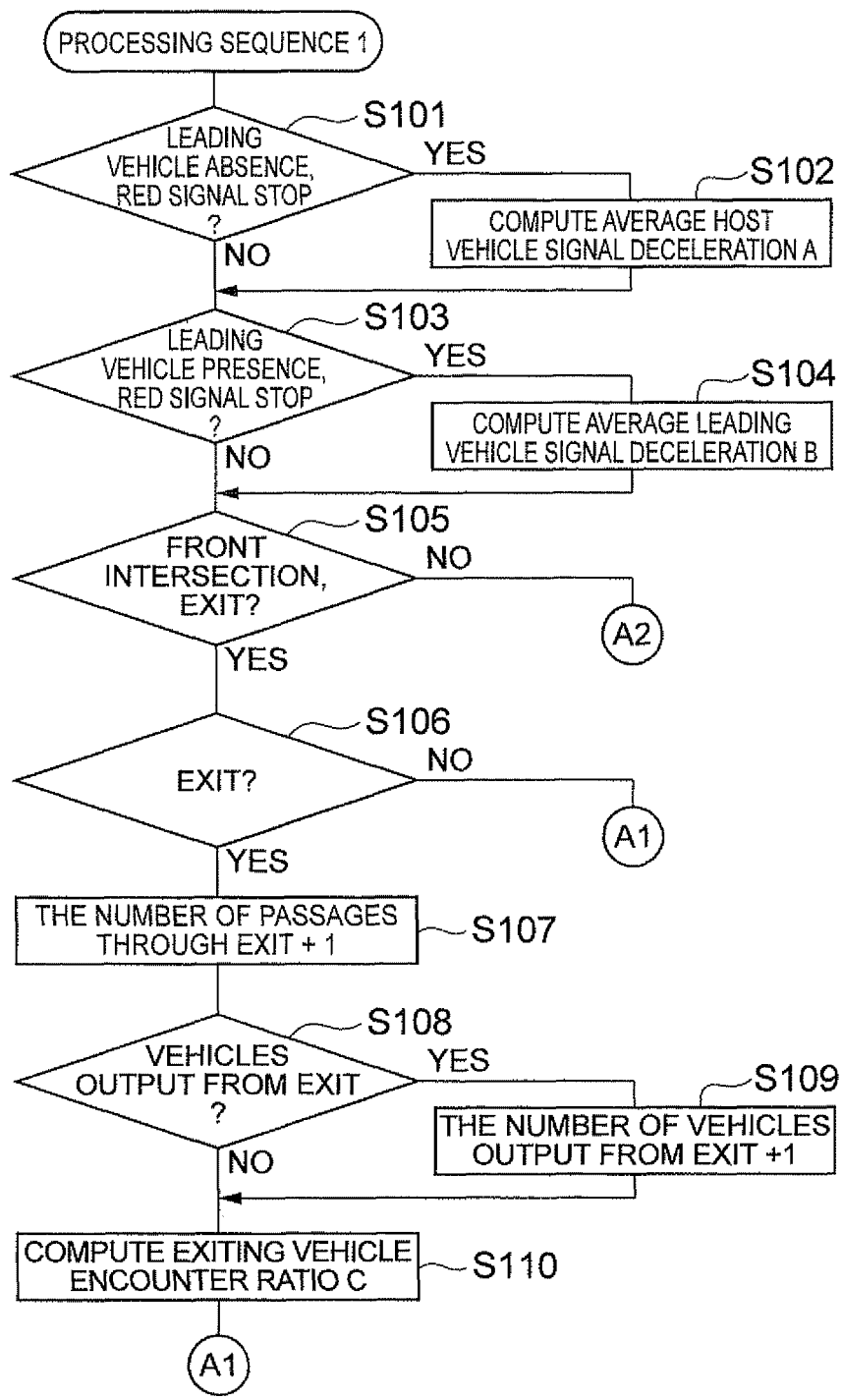
FIG. 6 is a flowchart illustrating an operation of a vehicle control device according to the first embodiment.

As shown in FIG. 6, the vehicle control device 100 determines the presence of a leading vehicle and whether a host vehicle stops due to a red signal (S101). The vehicle control device 100 determines the presence of the leading vehicle using radar 13. From the location of the traffic signal acquired by a navigation system 11 and the speed of the host vehicle becoming 0 km/h by the vehicle wheel speed sensor 17, the vehicle control device 100 determines that the host vehicle is stopped due to the red signal. When there is no leading vehicle and the host vehicle is stopped due to the red signal (S101), the vehicle control device 100 detects the deceleration of the host vehicle by a vehicle wheel speed sensor 17, and computes and stores an average thereof as an average host vehicle signal deceleration A in a memory 104 (S102).

Meanwhile, when there is the leading vehicle and the host vehicle is stopped due to the red signal (S103), the vehicle control device 100 detects deceleration of the leading vehicle, and computes and stores an average thereof as an average leading vehicle signal deceleration B in the memory 104 (S104). The vehicle control device 100 detects the deceleration of the leading vehicle from the location of the traffic signal acquired by the navigation system 11, relative speed between the leading vehicle and the host vehicle detected by the radar 13, and the speed of the host vehicle detected by the vehicle wheel speed sensor 17. Further, when the average host vehicle signal deceleration A is less than the average leading vehicle signal deceleration B, the vehicle control device 100 sets the average host vehicle signal deceleration A as the average leading vehicle signal deceleration B.

The vehicle control device 100 determines whether an intersection or an exit leading to a road on which the host vehicle travels is present, for example, within a range of 1 km in front of the host vehicle based on information acquired by the navigation system 11 or a road-to-vehicle communication device 12 (S105). In this case, the presence of a traffic signal does not affect the intersection. In addition, the exit in this case is intensively determined to be an exit with large numbers of vehicles entering and exiting, particularly a parking lot for retail premises, and the like. If there are no intersections or exits, the vehicle control device 100 performs step S121 to be illustrated in FIG. 7.

Figure 7:
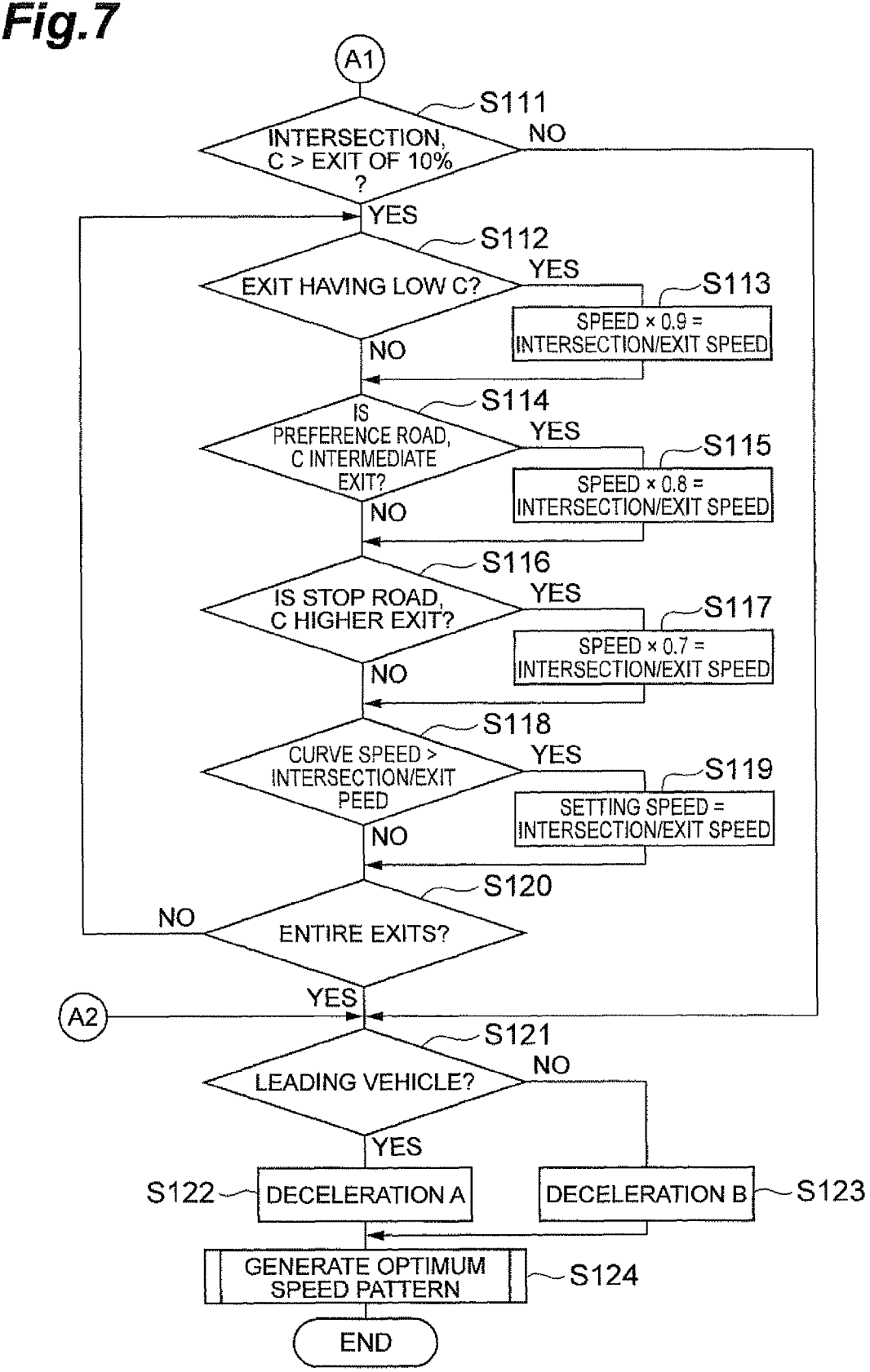
FIG. 7 is a flowchart illustrating an operation of a vehicle control device according to the first embodiment.

When there is no exit leading to the road on which the host vehicle travels (S106), the vehicle control device 100 performs step S111 to be illustrated in FIG. 7. When there is an exit leading to the road on which the host vehicle travels (S106), the vehicle control device 100 adds "1" to the number of passages through the exit, and thereafter stores the number of passages through the exit in the memory 104 (S107).

The vehicle control device 100 detects another vehicle exiting through the exit using an image imaged by the radar 13 or a camera (S108). If there are vehicles exiting through the exit (S108), the vehicle control device 100 adds "1" to the number of vehicles from the exit for each of other vehicles and stores the number of exiting vehicles after addition in the memory 104 (S109).

The vehicle control device 100 references the number of exiting vehicles to that position stored in the memory 104 and the number of passages through the exit at that position, and removes the number of passages through the exit to compute an exiting vehicle encounter ratio C (S110).

As illustrated in FIG. 7, when there is an intersection in front of the host vehicle or an exiting vehicle encounter ratio C of an exit in front of the host vehicle is, for example, less than 10% (S111), the vehicle control device 100 performs step S121 to be illustrated in FIG. 3. When there is no intersection in front of the host vehicle or the exiting vehicle encounter ratio C of an exit in front of the host vehicle is equal to or greater than 10% (S111), the vehicle control device 100 sets speed (determine the position of the lowest speed) to be illustrated below as setting a preliminary condition for generating a speed pattern including an acceleration travel pattern and an inertia travel pattern. That is, the vehicle control device 100 performs a process of matching a position in which the speed of the host vehicle becomes a local minimum value in the intersection or the exit.

In the case of an exit of a parking lot or the like where an exit encounter ratio C is low, for example, about 10 to 30% (S112), the vehicle control device 100 sets an upper limit speed (referred to as intersection/exit speed hereinafter) based on an intersection or an exit of the position to a value slightly less than the highest speed such as the legal maximum speed estimated for the road (S113). For example, the vehicle control device 100 sets the intersection exit speed to the highest speed such as the legal maximum speed estimated for the road×0.9 (S113).

When the position is an intersection without obligation to stop, such as a temporary stop or a traffic signal, or it comes to an exit of a parking lot or the like where an exit encounter ratio C is intermediate, for example, about 30 to 50% (S114), the vehicle control device 100 sets the intersection/exit speed of the position to a value significantly reduced from the value in step S113 (S115). For example, the vehicle control device 100 sets the intersection/exit speed to the highest speed such as the legal maximum speed or the like estimated for the road×0.8 (S115).

When the position is an intersection with an obligation to stop such as a temporary stop or a traffic signal or it comes to an exit of a parking lot or the like where the exit encounter ratio C is high, for example, 50% or greater (S116), the vehicle control device 100 sets the intersection/exit speed of the position to a value significantly reduced from the value in step S115 (S117). For example, the vehicle control device 100 sets the intersection/exit speed to the highest speed, such as the legal maximum speed or the like estimated for the road× 0.7 (S117).

As mentioned above, the intersection/exit speed is set as illustrated in FIG. 5. Here, the curve speed which is the upper limit speed in each position according to a curve in the road on which the host vehicle travels is greater than the intersection/exit speed determined in steps S112 to S117 (S118), the vehicle control device 100 resets the setting speed in each position in a speed pattern to the intersection/exit speed determined in steps S112 to S117 (S119). If the curve speed is not greater than the intersection/exit speed determined in steps S112 to S117 (S118), the vehicle control device 100 determines the setting speed in each position in the speed pattern to be a preset curve speed as is. That is, the vehicle control device 100 sets the lower of the intersection/exit speed determined in steps S112 to S117 and the preset curve speed as the setting speed.

When there are a plurality of intersections or exits within, for example, one km to the front of the host vehicle, the vehicle control device 100 repeats steps S112 to S119 (S120).

When there is the leading vehicle (S121), the vehicle control device 100 sets the average host vehicle signal deceleration A as the deceleration speed (S122). When there is no leading vehicle (S121), the vehicle control device 100 sets the average leading vehicle signal deceleration B as the deceleration speed (S123). As illustrated above, when the average host vehicle signal deceleration A is less than the average leading vehicle signal deceleration B, the vehicle control device 100 sets the average host vehicle signal deceleration A as the average leading vehicle signal deceleration B. Accordingly, the vehicle control device 100 sets the smaller of the average host vehicle signal deceleration A and the average leading vehicle signal deceleration B.

As illustrated above, the vehicle control device 100 generates a speed pattern with the highest fuel efficiency according to the curve speed, the intersection/exit speed, and the deceleration as described previously as shown in FIG. 5 (S124). Since the setting speed in each position is acquired according to the processing of steps S101 to S123, the vehicle control device 100 smoothly connects the setting speeds for each position to generate a speed pattern as shown in FIG. 5.

The vehicle control device 100 executes the speed pattern by helping an operation of a driver by a steering controller 21 or an acceleration/deceleration controller 23. Alternatively, the vehicle control device 100 provides information about a speed pattern to the driver by interface such as a display or a speaker to execute the speed pattern. In an exit, an intersection, or a position with a traffic signal, the vehicle control device 100 allows the driver to freely perform an operation and supports the operation of the driver.

In this embodiment, since the vehicle control device 100 generates a speed pattern alternately repeating an acceleration travel pattern having a section accelerating a vehicle and an inertia travel pattern having a section with a driving force of zero in the acceleration direction with respect to the wheels of a host vehicle and a braking force of zero in the deceleration direction by applying a driving force in the acceleration direction with respect to the wheels of a host vehicle, fuel efficiency may be improved. Further, the vehicle control device 100 generates a speed pattern such that the speed of the host vehicle is reduced in front of a position of an intersection of the road on which the host vehicle travels and an exit leading to the road on which the host vehicle travels. The intersection and the exit have possibility to encounter with another vehicle and is a position compelled to reduce speed including another vehicle forming a traffic flow on the road on which the host vehicle travels. Accordingly, by matching a position whose vehicle speed of a speed pattern is reduced with a position of the intersection or the exit which is compelled to reduce speed, fuel efficiency may be improved while cooperating with traffic around the host vehicle.

In the related art, if a condition regulating the upper limit speed of a curve or the like is given, the speed of a speed pattern with optimal fuel efficiency may be set within those conditions. However, for example, since the only condition suppressing speed is the legal maximum speed in a long, flat straight path, if the legal maximum speed becomes after a travel maintaining a constant legal maximum speed or after acceleration, it is subjected to a simple control, such as performing travel by inertia or the like. For this reason, a host vehicle cannot travel with cooperating with a general peripheral vehicle changing complicated conditions such as safety or the like. However, in this embodiment, the host vehicle can improve fuel efficiency while cooperating with traffic surrounding the host vehicle.

Further, in this embodiment, the vehicle control device 100 generates a speed pattern in which the speed of the host vehicle becomes a local minimum value in front of a position of any one of the intersection and the exit. By matching the local minimum value of vehicle speed of a speed pattern with a position of an intersection or an exit which is locally compelled to reduce speed, fuel efficiency may be improved while cooperating with traffic around the host vehicle, thereby increasing efficiency.

There is a traffic signal on a general road that cannot receive information in advance regarding a signal displayed from a traffic signal through wireless communication, such as an optical beacon or the like. Although information regarding a traffic signal may be received in advance on the general road, there is a traffic signal which cannot anticipate the time of a red signal in advance because the signal, such as a sensitive traffic signal, changes according to presence of a vehicle on an intersection road. By matching the vehicle speed with the local minimum value of vehicle speed of a speed pattern near an intersection by applying conditions of a curve speed, fuel efficiency may be improved while cooperating with traffic around the host vehicle and, thereby increasing efficiency.

If considering the actions of a general driver, even a green signal is showing, a general driver reduces their speed in front of the traffic light from the normal speed and accelerates once again. This is assumed to be for safety in the intersection or to be deceleration to prepare for a yellow signal. A speed pattern generated in this embodiment may match the action of a general driver to prevent providing the driver with a sense of unease.

Furthermore, in this embodiment, the vehicle control device 100 generates a travel pattern such that the speed of a host vehicle is more reduced in front of either one of an intersection and an exit in the case of higher possibility of the host vehicle encountering another vehicle. The vehicle control device generates a travel pattern such that the speed of the host vehicle is further reduced corresponding to a position having a high possibility of encounter with vehicles and a high possibility of being compelled to reduce speed, so that the host vehicle cooperates with traffic surrounding the host vehicle and fuel efficiency may be improved, thereby further increasing efficiency.

In an exit of a parking lot, the frequency of vehicles exiting changes according to the type of shop. In this embodiment, the past history is recognized to calculate an exit vehicle encounter rate C, thereby preventing unnecessary deceleration corresponding to a reduced speed such that speed is reduced corresponding to increased degree of the exit vehicle encounter rate C. Moreover, in this embodiment, according to whether a temporary stop or a stop duty such as a traffic signal or the like exists on a road side which the host vehicle travels, upper limit speed is adjusted, so that upper limit speed may be sufficiently set according to a ratio of the host vehicle encountering with another vehicle.

According to this configuration, the vehicle control device 100 sets the deceleration in a speed pattern according to the average deceleration by an operation of a driver for a host vehicle during a stop signal when there is no leading vehicle. When there is a leading vehicle, the vehicle control device sets the deceleration in a speed pattern according to the smaller of average deceleration of the leading vehicle and average deceleration by an operation of the driver of the host vehicle during a stop signal. When there is no leading vehicle, deceleration in the speed pattern may be set according to the average deceleration by an operation of a driver for a host vehicle during a stop signal to prevent a sense of unease in the driver of the host vehicle. When there is the leading vehicle, the deceleration in a speed pattern may be set according to the smaller of average deceleration of the leading vehicle and average deceleration by an operation of the driver of the host vehicle during a stop signal to prevent contact with the leading vehicle, thereby resulting in the generation of a speed pattern cooperating with traffic surrounding the host vehicle.

Hereinafter, a second embodiment of the present invention will be described. In this embodiment, a local minimum value of vehicle speed in the speed pattern is set in consideration of a difference of a time when visual confirmation of a traffic signal by a driver is possible or an installed situation of a traffic signal indicating whether a traffic signal can acquire information regarding a displayed signal by wireless communication such as an optical beacon or the like.

Figure 8:
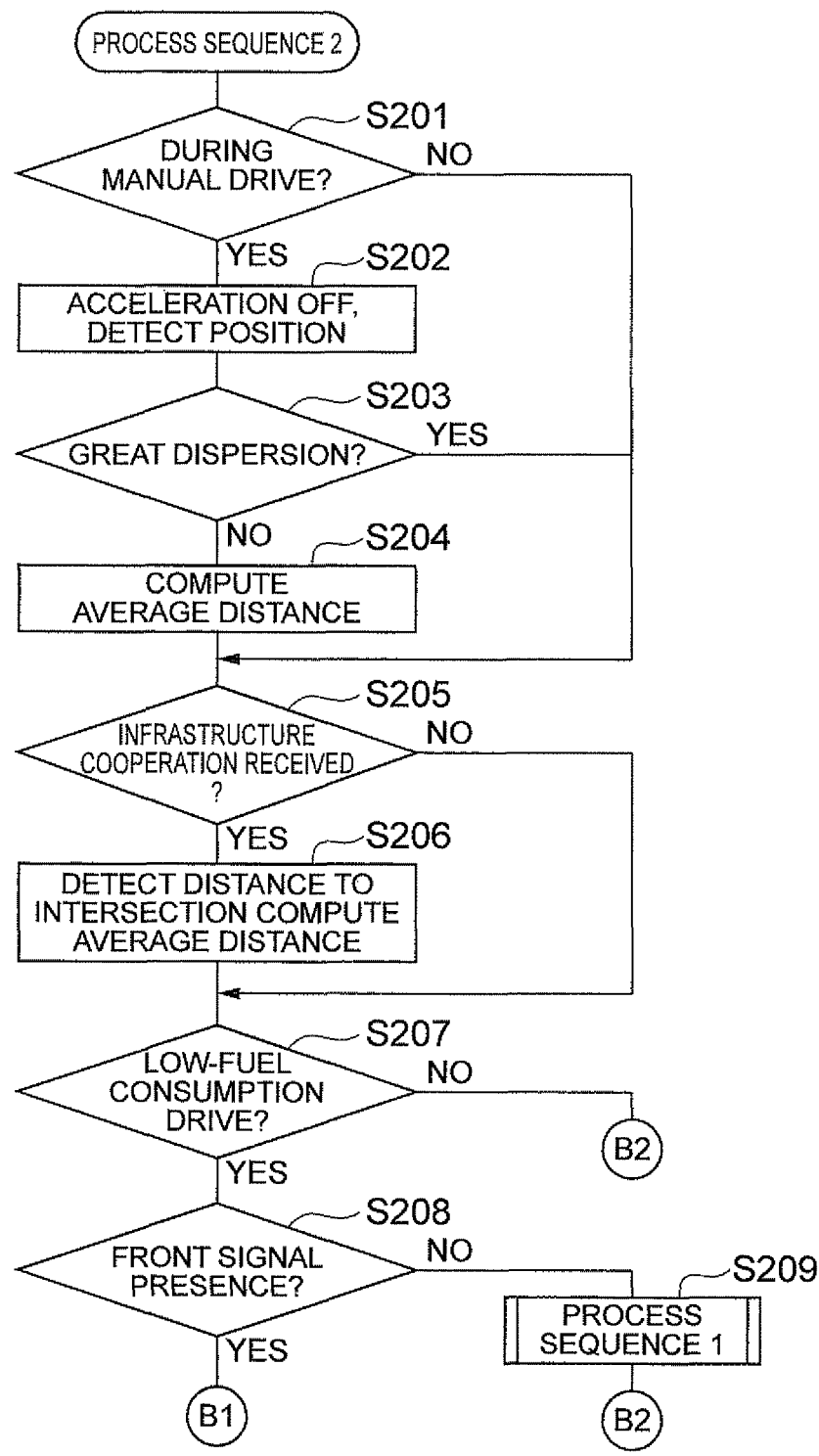
FIG. 8 is a flowchart illustrating an operation of a vehicle control device according to the second embodiment.

As illustrated in FIG. 8, during a general manual operation (S201), in a case where the host vehicle is stopped due to a red signal, a vehicle control device 100 detects the distance from a traffic signal of a position when the driver of the host vehicle starts OFF of acceleration or ON of a brake pedal to reduce speed and stores the detected distance (S202). In this embodiment, after confirming a signal, the driver estimates a system determining whether low-fuel consumption travel by a speed pattern repeating an acceleration travel pattern and an inertia travel pattern can continue. Furthermore, in the embodiment of the invention, after the driver confirms the signal, when it is determined that low-fuel consumption travel by the speed pattern cannot continue, the driver pushes the brake pedal with their foot to estimate a system instruction stop of a speed pattern to the vehicle control device 100.

The vehicle control device 100 detects an average value of a distance from a traffic signal of a position starting deceleration for each traffic signal (S204). The vehicle control device 100 determines that the host vehicle is stopped due to a red signal from a location of a traffic signal acquired by the navigation system 11 by the vehicle wheel speed sensor 17 and a case where speed of the host vehicle becomes 0 km/h.

However, the vehicle control device 100 determines that the host vehicle is reducing speed due to other causes such as another vehicle or the like intervened in front thereof, and omits, for example, data dispersed greater than a standard deviation among data of the distance from a traffic signal of a position starting deceleration (S203).

When information regarding a signal displayed by the traffic signal can be acquired by wireless communication such as an optical signal or the like during travel (S205), the vehicle control device 100 detects the distance to a traffic signal (intersection) of a time position when acquiring information to calculate an average value of the detected distance (S206).

If low-fuel consumption driving by a speed pattern repeating an acceleration travel pattern and an inertia travel pattern is not performed (S207), the vehicle control device 100 terminates the process. When there is no traffic signal in front of the host vehicle (S208), the vehicle control device 100 performs the same process as that in a process sequence 1 shown in FIG. 6 and FIG. 7 (S209), and then terminates the process.

Figure 9:
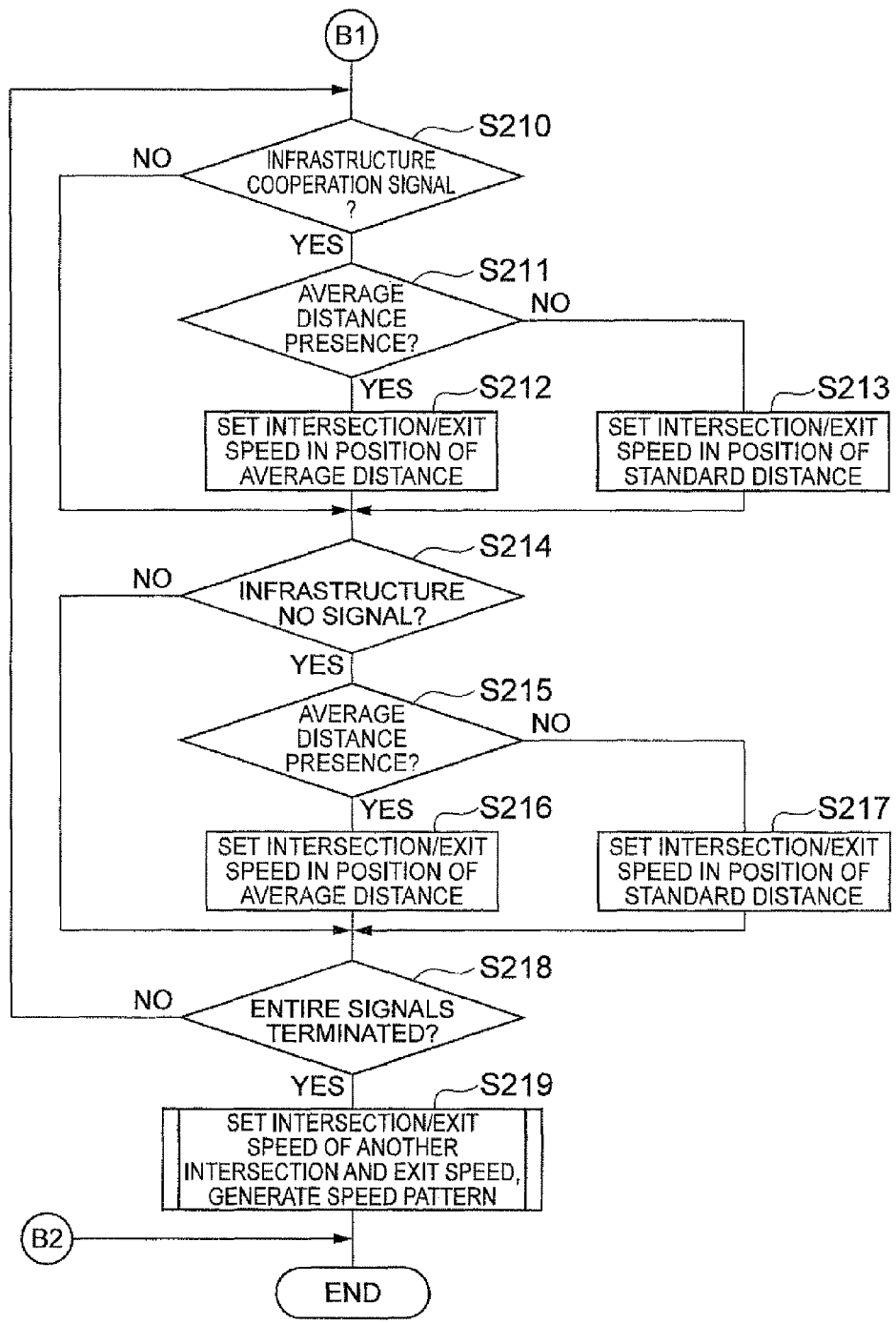
FIG. 9 is a flowchart illustrating an operation of a vehicle control device according to the second embodiment.

As illustrated in FIG. 9, for example, 1 km in front of the host vehicle, when there is a traffic signal capable of acquiring information regarding a signal displayed by wireless communication, such as an optical beacon or the like (S210), the vehicle control device 100 checks whether there is an average distance calculated in process S206 with respect to a corresponding traffic signal by referring to the memory 104 (S211). When there is an average distance (S211), the vehicle control device 100 generates a speed pattern in which the speed becomes the upper limit speed in a position in front of a traffic signal corresponding to the average distance (S212). When there is no average distance (S211), the vehicle control device 100 generates a speed pattern in which the speed becomes the upper limit speed in a position in front of the traffic signal corresponding to a standard distance capable of acquiring information of 200 m (S213). For example, the vehicle control device 100 sets the intersection exit speed to the highest speed such as the legal maximum speed or the like estimated for the road×0.8 (S212, S213).

For example, 1 km in front of the host vehicle, when there is a traffic signal capable of not acquiring information regarding a signal displayed by wireless communication, such as an optical beacon or the like (S214), the vehicle control device 100 checks whether there is an average distance calculated in step S204 with reference to the memory 104, (S215). When there is an average distance (S215), the vehicle control device 100 generates a speed pattern in which the speed becomes the intersection/exit speed in a position in front of the traffic signal corresponding to the average distance (S216).

When there is no average distance (S215), the vehicle control device 100 calculates the visibility distance of a traffic signal being the longest distance when drawing a straight line on a road from the traffic signal by a general geometric calculation based on information regarding a road line shape acquired by a navigation system 11 or the like. The vehicle control device 100 generates a speed pattern which becomes intersection/exit speed in a position in front of the traffic signal corresponding to the calculated visibility distance of the traffic signal (S217).

For example, the vehicle control device 100 sets the intersection exit speed to the highest speed such as the legal maximum speed or the like estimated for the road×0.7 (S212, S213). When information cannot be acquired by the optical beacon or the like, the vehicle control device 100 values a free degree of an operation of a driver in comparison with a case where information may be acquired by an optical beacon or the like and sets the intersection/exit speed to low speed.

For example, when there is a plurality of signals 1 km to the front of the host vehicle, the vehicle control device 100 repeats steps S210 to S217 (S218). The vehicle control device 100 sets the intersection/exit speed of another intersection or the like similarly to the process sequence 1 of the first embodiment using the intersection/exit speed set in steps S201 to S218 as an additional condition to generate the speed pattern (S219).

In this embodiment, travel control device 100 generates a speed pattern in which the vehicle target speed is reduced in a position that a signal displayed on a traffic signal of the road on which the host vehicle travels becomes known. There are various types including a traffic signal having excellent prospect from a host vehicle, a traffic signal having bad prospect from the host vehicle, and a traffic signal capable of receiving information of signals displayed by an optical beacon or the like as examples of a traffic signal on a general road. For this reason, since the speed pattern generating unit generates a speed pattern in which the target speed of a host vehicle is reduced in a position that a signal displayed on a traffic signal becomes known instead of uniformly reducing speed in front of the traffic signal, it can generate a speed pattern capable of improving fuel efficiency according to the situation.

Further, the travel control device 100 generates a speed pattern in which speed of the host vehicle becomes the local minimum value in a position that a signal displayed on any of traffic signals of the intersection and the exit becomes known. For this reason, a speed pattern capable of improving the fuel efficiency according to a situation of a traffic signal can be generated with higher efficiency.

Moreover, the travel control device 100 sets an average position in which deceleration starts by an operation of a driver for a host vehicle in a position that a signal displayed on the traffic signal of the road on which the host vehicle travels becomes known. This may prevent uncomfortable feeling of a driver of the host vehicle.

In addition, the travel control device 100 sets a position that a signal displayed on the traffic signal of the road on which the host vehicle travels becomes known according to a situation with respect to whether information related to the signal displayed by the traffic signal is obtained by wireless communication. According to whether the information about the signal displayed by the traffic signal is obtained by wireless communication such as an optical beacon, the realizable speed pattern is greatly changed. For this reason, a speed pattern in which fuel efficiency may be improved according to the situation of the traffic signal can be generated with higher efficiency.

Hereinafter, a third embodiment of the present invention will be described. In this embodiment, a time when speed in a speed pattern of a host vehicle becomes the local minimum value of a vehicle target speed is matched to the deceleration time of a leading vehicle. Furthermore, in this embodiment, it is determined whether a speed pattern is executed in a host vehicle in consideration of a density of a traffic flow around the host vehicle.

Figure 10:
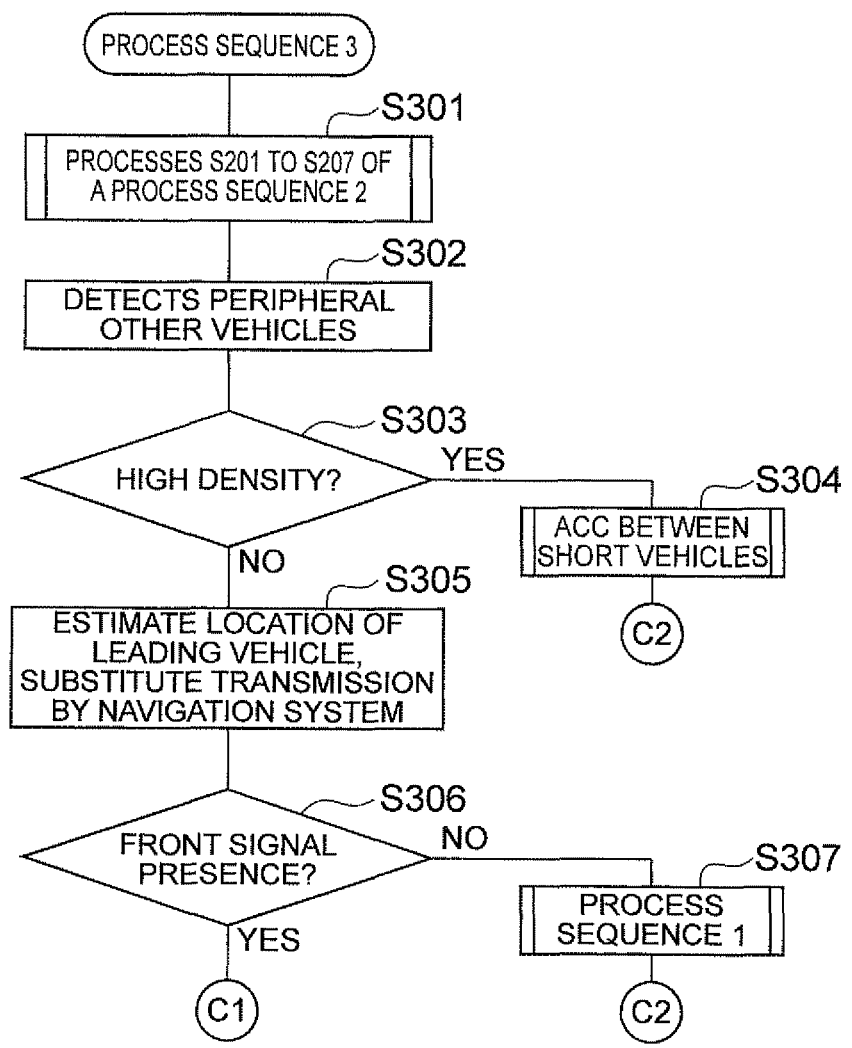
FIG. 10 is a flowchart illustrating an operation of a vehicle control device according to the third embodiment.

As illustrated in FIG. 10, the travel control device 100 performs processes S201 to S207 of a process sequence 2 according to the second embodiment (S301). The travel control device 100 detects other vehicles surrounding the host vehicle using a front radar, a rear radar, a front-side radar, a rear-side radar, and the like of the radar 13 (S302). When the density of vehicles (another vehicle except for a vehicle coming in an opposite direction) advancing in the same direction as the host vehicle forming a traffic flow is equal to or higher than a predetermined threshold value, for example, when there is another vehicle in each direction around the host vehicle (S303), the vehicle control device 100 stops low-fuel consumption travel through a speed pattern including an acceleration travel pattern an inertia travel pattern, and switches to a general Adaptive Cruse Control (ACC) in which the time between vehicles is set within, for example, 1 second (S304), and terminates the process.

When the density of vehicles (another vehicle except for a vehicle coming in an opposite direction) advancing in the same direction as the host vehicle forming a traffic flow is less than the predetermined threshold value, the travel control device 100 estimates a location of a leading vehicle based on information regarding the location of the host vehicle acquired by the navigation system 11, information regarding the distance between vehicles detected by the radar 13. The travel control device 100 substitutes the location of the leading vehicle estimated by the navigation system 11 for the location of the host vehicle (S305), and performs following processes.

When there is no traffic signal in front of the host vehicle (S306), the travel control device 100 performs the same processing as that of process sequence 1 illustrated in FIG. 6 and FIG. 7 (S307), and terminates the process.

Figure 11:
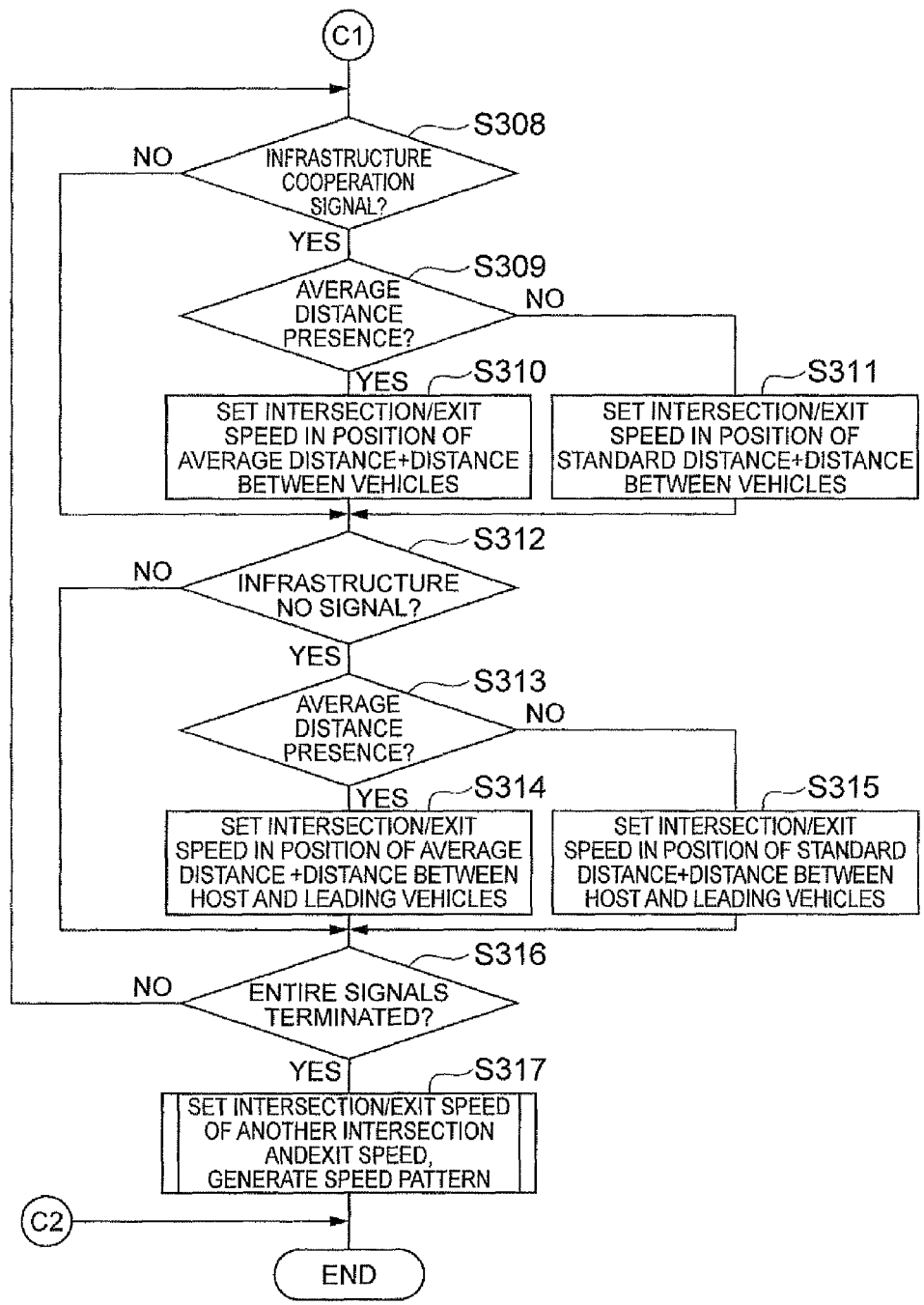
FIG. 11 is a flowchart illustrating an operation of a vehicle control device according to the third embodiment.

As illustrated in FIG. 11, for example, 1 km in front of the host vehicle, when there is a traffic signal capable of acquiring information regarding a signal displayed by wireless communication such as an optical beacon or the like (S308), the vehicle control device 100 checks whether there is an average distance calculated in process S301 with respect to a corresponding traffic signal with reference to the memory 104 (S309). When there is the average distance (S309), the vehicle control device 100 generates a speed pattern in which the speed becomes an intersection/exit speed in a position in front of a traffic signal corresponding to the average distance+the distance between the host vehicle and the leading vehicle from a leading vehicle (S310). When there is no average distance (S309), the vehicle control device 100 generates a speed pattern in which the speed becomes the intersection/exit speed in a position in front of a traffic signal corresponding to a standard distance capable of acquiring information of 200 m+a distance between the host vehicle and the leading vehicle (S311). For example, the vehicle control device 100 sets the intersection exit speed to the highest speed such as the legal maximum speed or the like estimated for the road×0.8 (S310, S311).

For example, 1 km in front of the host vehicle, when there is a traffic signal capable of not acquiring information regarding a signal displayed by wireless communication such as an optical beacon or the like (S312), the vehicle control device 100 checks whether there is an average distance calculated in step S301 with reference to a memory 104 (S313). When there is the average distance (S313), the vehicle control device 100 generates a speed pattern in which the speed becomes the intersection/exit speed in a position in front of the traffic signal corresponding to the average distance+the distance between the host vehicle and the leading vehicle (S314).

When there is no average distance (S312), the vehicle control device 100 calculates a visibility distance of a traffic signal being the longest distance when drawing a straight line on a road from the traffic signal by a general geometric calculation based on information regarding a road line shape acquired by a navigation system 11 or the like. The vehicle control device 100 generates a speed pattern which becomes the intersection/exit speed in a position in front of the traffic signal corresponding to the calculated visibility distance+the distance between the host vehicle and the leading vehicle of the traffic signal (S315).

For example, the vehicle control device 100 sets the intersection exit speed to the highest speed such as the legal maximum speed or the like estimated for the road×0.7 (S314, S315). When information cannot be acquired by the optical beacon or the like, the vehicle control device 100 values a free degree of an operation of a driver in comparison with a case where information may be acquired by an optical beacon or the like and sets the intersection/exit speed to the low speed.

When there are a plurality of signals 1 km to the front of the host vehicle, the vehicle control device 100 repeats steps S308 to S315 (S316). The vehicle control device 100 sets the intersection/exit speed of another intersection or the like in the same as in the process sequence 1 of the first embodiment using the intersection/exit speed set in steps S301 to S316 as an additional condition to generate the speed pattern (S317).

In this embodiment, when there is a leading vehicle, the vehicle control device 100 sets a position distant from an average position starting deceleration of the leading vehicle by a distance between the leading vehicle and the host vehicle in front of the traffic signal as a position that a signal displayed on the traffic signal of the road on which the host vehicle travels becomes known. By doing this, a speed pattern for improving fuel efficiency according to the situation of a traffic signal while cooperating with traffic around the host vehicle can be generated.

Further, in this embodiment, when the density of other vehicles present around the host vehicle is equal to or greater than a predetermined threshold value, the vehicle control device 100 does not execute a speed pattern having an acceleration travel pattern and an inertia travel pattern in the host vehicle. When the density of other vehicles existing around the host vehicle is equal to or greater than the predetermined threshold value, there is a case where an automatic travel method is not preferable because of low-fuel consumption. For this reason, when the density of other vehicles existing around the host vehicle is equal to or greater than the predetermined threshold value, the vehicle control device 100 does not execute a speed pattern for low-fuel consumption to cooperate with traffic around the host vehicle.

That is, in this embodiment, since travel can be realized in consideration of deceleration of the leading vehicle or the density of a surrounding traffic flow, a speed pattern for improving fuel efficiency more naturally and steadily can be generated.

Although embodiments of the present invention have been described in detail above, many variations and modifications may be achieved without limiting the embodiments. For example, the foregoing embodiment has illustrated an example of applying the invention to a hybrid system (hybrid vehicle) combining an internal-combustion engine and an electric motor as driving sources. However, the invention is not limited to the hybrid system. The invention is equally applicable to a system capable of stopping an internal-combustion engine, such as an engine, during travel. In addition, without stopping a heat engine during execution of the inertia travel pattern, the inertia travel pattern can be executed only by sectioning a driving force of the heat engine to vehicle wheels.

INDUSTRIAL APPLICABILITY

According to a vehicle control device of the invention, fuel efficiency can be improved while cooperating with traffic around the host vehicle.

REFERENCE SIGNS LIST

11: NAVIGATION SYSTEM
12: ROAD-TO-VEHICLE COMMUNICATION DEVICE
13: RADAR
14: STEERING WHEEL OPERATION AMOUNT SENSOR
15: BRAKE OPERATION AMOUNT SENSOR
16: ACCELERATOR OPERATION AMOUNT SENSOR
17: YAW RATE SENSOR
18: VEHICLE WHEEL SPEED SENSOR
19: LANE RECOGNITION SENSOR
21: STEERING CONTROL DEVICE
22: STEERING ACTUATOR
23: ACCELERATION/DECELERATION CONTROL DEVICE
24: HV SYSTEM
25: BRAKE ACTUATOR
100: VEHICLE CONTROL DEVICE
102: CONTROLLER
104: MEMORY

The invention claimed is:
1. A vehicle control device that controls a host vehicle, the vehicle control device comprising:
a speed pattern generating unit that generates a speed pattern alternately repeating (i) an acceleration travel pat- tern having a section in which the host vehicle is accelerated by applying a driving force in an acceleration direction with respect to wheels of the host vehicle and (ii) an inertia travel pattern having a section with a driving force of zero in the acceleration direction and a braking force of zero in a deceleration direction with respect to the wheels of the host vehicle, wherein the speed pattern generating unit (A) generates the speed pattern such that a speed of the host vehicle is reduced in front of a position of (1) an intersection between a crossroad and a road on which the host vehicle travels or (2) an exit leading onto the road on which the host vehicle travels, and (B) generates the speed pattern such that a reduction of the speed of the host vehicle is increased in front of the position of the intersection or the exit as a possibility of the host vehicle encountering another vehicle in the intersection or the exit increases, when there is no leading vehicle, which is a vehicle in front of the host vehicle detected by a radar or camera system of the host vehicle, the speed pattern generating unit sets deceleration in the speed pattern according to an average deceleration performed by an operation of a driver of the host vehicle approaching a stop signal, and when there is the leading vehicle, the speed pattern generating unit sets the deceleration in the speed pattern according to a smaller one of (i) an average deceleration of the leading vehicle and (ii) the average deceleration performed by the operation of the driver of the host vehicle approaching the stop signal.

2. The vehicle control device according to claim 1, wherein the speed pattern generating unit generates the speed pattern such that the speed of the host vehicle becomes a local minimum value in front of the position of the intersection or the exit.

3. The vehicle control device according to claim 1, wherein the speed pattern generating unit generates the speed pattern such that the speed of the host vehicle is reduced in a position that a signal displayed on any of traffic signals of the intersection and the exit becomes visible from the host vehicle.

4. The vehicle control device according to claim 1, wherein the speed pattern generating unit generates the speed pattern such that the speed of the host vehicle becomes a local minimum value in a position that a signal displayed on any of traffic signals of the intersection and the exit becomes visible from the host vehicle.

5. The vehicle control device according to claim 3, wherein the speed pattern generating unit sets an average position in which deceleration starts by an operation of a driver of the host vehicle in front of the traffic signal as the position that the signal displayed on the traffic signal becomes visible from the host vehicle.

6. The vehicle control device according to claim 3, wherein when there is the leading vehicle, the speed pattern generating unit sets a position separated from an average position in which deceleration of the leading vehicle starts by a distance between the leading vehicle and the host vehicle in front of the traffic signal as the position that the signal displayed on the traffic signal becomes visible from the host vehicle.

7. The vehicle control device according to claim 3, wherein the speed pattern generating unit sets the position that the signal displayed on the traffic signal becomes visible from the host vehicle according to whether information about the signal displayed on the traffic signal is obtained by wireless communication.

8. The vehicle control device according to claim 1, wherein the speed pattern generating unit does not execute the speed pattern in the host vehicle when a density of other vehicles existing around the host vehicle is equal to or greater than a predetermined threshold value.

\* \* \* \* \*